US012592058B2

(12) United States Patent
Moriyama et al.

(10) Patent No.: US 12,592,058 B2
(45) Date of Patent: Mar. 31, 2026

(54) DATA GENERATING METHOD, LEARNING METHOD, ESTIMATING METHOD, DATA GENERATING DEVICE, AND PROGRAM

(71) Applicant: Sony Semiconductor Solutions Corporation, Kanagawa (JP)

(72) Inventors: Yutaka Moriyama, Kanagawa (JP); Yoshiki Ando, Kanagawa (JP); Hajime Hosaka, Kanagawa (JP); Ryuhei Hata, Kanagawa (JP); Yusuke Shinmi, Tokyo (JP); Yoshikuni Nomura, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 639 days.

(21) Appl. No.: 17/909,828

(22) PCT Filed: Mar. 12, 2021

(86) PCT No.: PCT/JP2021/010077
§ 371 (c)(1),
(2) Date: Sep. 7, 2022

(87) PCT Pub. No.: WO2021/187365
PCT Pub. Date: Sep. 23, 2021

(65) Prior Publication Data
US 2023/0267707 A1     Aug. 24, 2023

(30) Foreign Application Priority Data

Mar. 19, 2020     (JP) ................................. 2020-049978

(51) Int. Cl.
*G06V 10/774*     (2022.01)
*G06T 5/50*     (2006.01)
*G06T 5/60*     (2024.01)

(52) U.S. Cl.
CPC .............. *G06V 10/774* (2022.01); *G06T 5/50* (2013.01); *G06T 5/60* (2024.01)

(58) Field of Classification Search
CPC ........... G06V 10/774; G06T 5/50; G06T 5/60; G06T 2207/20081; G06T 2207/20084; G06N 3/042; G06N 3/098; H04N 23/60
See application file for complete search history.

(56) References Cited

U.S. PATENT DOCUMENTS

| | | | |
|---|---|---|---|
| 11,017,259 B2* | 5/2021 | Ambikapathi ......... | G06V 10/44 |
| 2013/0121537 A1* | 5/2013 | Monobe ............... | H04N 23/683 |
| | | | 382/106 |

(Continued)

FOREIGN PATENT DOCUMENTS

| | | |
|---|---|---|
| CN | 106952239 A | 7/2017 |
| CN | 107610193 A | 1/2018 |

(Continued)

OTHER PUBLICATIONS

Yang, X., Xu, K., Song, Y., Zhang, Q., Wei, X., & Lau, R. W. H. (2018). Image Correction via Deep Reciprocating HDR Transformation. 2018 IEEE, 1798-1807. https://doi.org/10.1109/CVPR.2018.00193 (Year: 2018).*

(Continued)

*Primary Examiner* — Stephen R Koziol
*Assistant Examiner* — Michael Kim Maiden
(74) *Attorney, Agent, or Firm* — Michael Best & Friedrich LLP

(57) ABSTRACT

An object is to obtain training data through an ideal image generated from an actually-shot image.
A data generating method of generating data used in learning a model using a processor, the data generating method including: generating an ideal image corresponding to output data of the model from a captured image obtained by a (Continued)

predetermined device; and generating a degraded image corresponding to input data of the model from the ideal image.

18 Claims, 13 Drawing Sheets

(56) References Cited

U.S. PATENT DOCUMENTS

| | | | |
|---|---|---|---|
| 2016/0344952 A1* | 11/2016 | Ichihara | H04N 13/232 |
| 2020/0117949 A1 | 4/2020 | Kimura | |

FOREIGN PATENT DOCUMENTS

| | | | | |
|---|---|---|---|---|
| CN | 109509159 A | * | 3/2019 | G06T 5/73 |
| CN | 109615604 A | * | 4/2019 | G06N 3/0454 |
| CN | 110770784 A | | 2/2020 | |
| JP | H06348840 A | | 12/1994 | |
| JP | 2018055516 A | | 4/2018 | |
| JP | 2019008383 A | | 1/2019 | |
| WO | WO-2018235746 A1 | | 12/2018 | |

OTHER PUBLICATIONS

Yang, X., Xu, K., Song, Y., Zhang, Q., Wei, X., & Lau, R. W. H. (2018). Image Correction via Deep Reciprocating HDR Transformation. 2018 IEEE/CVF Conference on Computer Vision and Pattern Recognition, 1798-1807. https://doi.org/10.1109/CVPR.2018.00193 (Year: 2018).*
International Search Report (PCT/ISA/210), International Application No. PCT/JP2021/010077, dated Jun. 15, 2021.
Pharr Matt et al: "Physically Based Rendering : From Theory To Implementation—Camera Models : Further Reading",, Oct. 15, 2018 (Oct. 15, 2018), pp. 1-2, XP093077658.
Yang Xin et al: "Image Correction via Deep Reciprocating HOR Transformation", 2018 IEEE/CVF Conference on Computer Vision and Pattern Recognition, IEEE, Jun. 18, 2018 (Jun. 18, 2018), pp. 1798-1807, XP033476144, DOI: 10.1109/CVPR.2018.00193 [retrieved on Dec. 14, 2018].

* cited by examiner

DATA GENERATING METHOD, LEARNING METHOD, ESTIMATING METHOD, DATA GENERATING DEVICE, AND PROGRAM

TECHNICAL FIELD

The present disclosure relates to a data generating method, a learning method, an estimating method, a data generating device, and a program.

BACKGROUND ART

Today, generation of estimation models and the like using machine learning such as deep learning are being widely researched. In a case in which machine learning is executed, it is necessary to input a lot of training data to a model to be generated. In addition, a lot of training data is necessary also for executing validation. In collection of training data used for generation of a model having images as inputs, it is necessary to obtain actual landscapes as photographs or draw pictures.

However, it takes effort for collection of data, and there is a high likelihood of human error and the like occurring. In addition, in the case of an actually-shot image, although it is simple to prepare an image, degradation elements (lens characteristics, image sensor characteristics, and characteristics according to signal processing) have already been added, and thus the degradation elements can be added only in a limited manner and inaccurately. Furthermore, also from a point of view of collection of teacher data, an actually-shot image already has degradation elements included, and thus it cannot be said that an actually-shot image is an ideal image for use as teacher data.

CITATION LIST

Patent Literature

[PTL 1]
JP H6-348840A

SUMMARY

Technical Problem

Thus, according to the present disclosure, an ideal image is generated from an actually-shot image, and training data is generated on the basis of this image.

Solution to Problem

According to one embodiment, there is provided a data generating method of generating training data used in learning a model using a processor, the data generating method including: generating an ideal image corresponding to output data of the model from a captured image obtained by a predetermined device; and generating a degraded image corresponding to input data of the model from the ideal image.

The ideal image may be generated on the basis of degradation relating to a lens of the predetermined device.

The ideal image may be generated on the basis of degradation relating to a sensor of the predetermined device.

The ideal image may be generated by reducing the captured image.

The ideal image may be generated on the basis of a plurality of still images in the same scene obtained by the predetermined device.

The ideal image may be generated on the basis of statistics in the plurality of still images.

The statistics may include at least one of a mean value, a mode, a median, or a variance value of each pixel.

The ideal image may be generated using a global offset for the captured image.

The ideal image may be generated by calibrating the captured image.

The degraded image may be generated on the basis of information about a target device that has captured an input image of the model.

The degraded image may be generated on the basis of degradation relating to a lens of the target device.

The degraded image may be generated on the basis of degradation relating to a sensor of the target device.

The degraded image may be generated on the basis of signal processing performed by the target device.

In a learning method, a model may be optimized using the training data generated by the data generating method described in any one of the descriptions presented above.

In an estimation method, estimation may be performed using a model optimized using training data generated by the data generating method described in any one of the descriptions presented above.

According to one embodiment, a data generating device that is a device generating training data used in learning a model may include a processor that executes any one of the methods described in the descriptions presented above.

According to one embodiment, a program may cause a computer to execute a method described in any one of the descriptions presented above.

DESCRIPTION OF EMBODIMENTS

Hereinafter, an embodiment of the present disclosure will be described with reference to the drawings.

Figure 1:
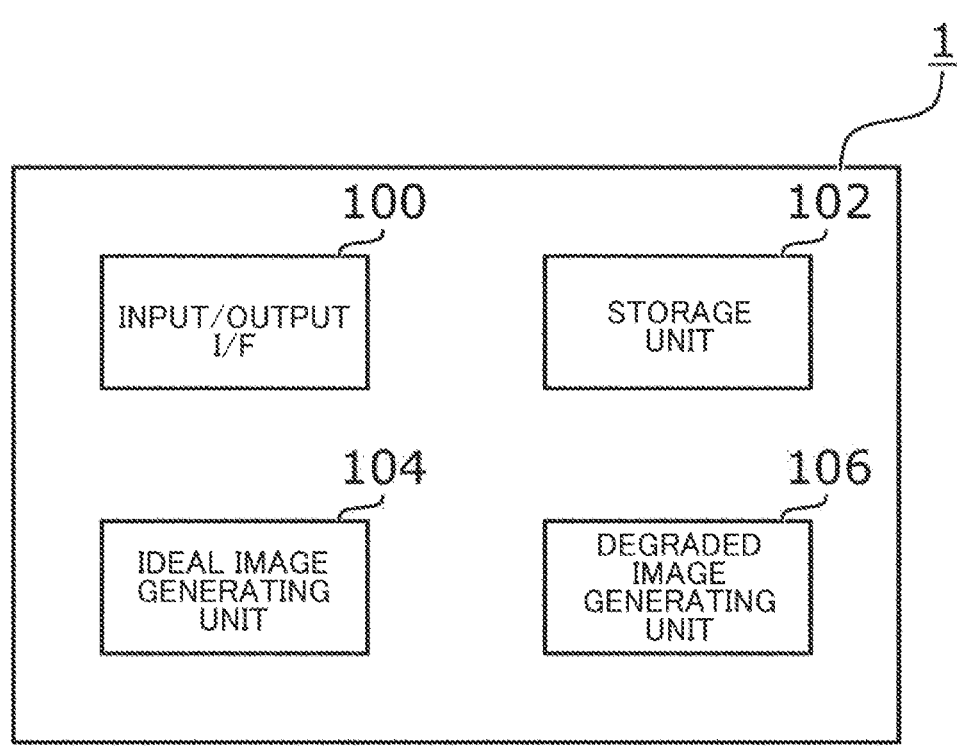
FIG. 1 is a diagram showing an example of a data generating device according to an embodiment.

FIG. 1 is a diagram showing an example of a data generating device according to an embodiment. The data generating device 1 includes an input/output interface (hereinafter referred to as an input/output I/F 100), a storage unit 102, an ideal image generating unit 104, and a degraded image generating unit 106.

The input/output I/F 100 is an interface that performs input of data to the data generating device 1 and output of data from the data generating device 1. Data is input to the data generating device 1 through the input/output I/F 100, and the data generating device 1 outputs data to the outside through the input/output I/F 100. For example, the data generating device 1 obtains image data actually imaged by various devices through the input/output I/F 100. In addition, the input/output I/F 100 may include an interface that accepts a command from a user and performs a certain output for the user. The configuration is not limited thereto, and the data generating device 1 may separately include an input I/F and an output I/F.

The storage unit 102 temporarily or non-temporarily stores data that is necessary for the data generating device 1. For example, the storage unit 102 includes a memory. In addition, in a case in which at least one of functions of the data generating device 1 is executed using software, the storage unit 102 may store a program used for executing at least one of the functions of the data generating device 1. For example, the storage unit 102 may store data input through the input/output I/F 100 or may store generated training data. In addition, the storage unit 102 may store appropriate results in progress and the like in a calculation process in the data generating device 1.

The ideal image generating unit 104 generates an ideal image from an image input from the input/output I/F 100 For example, by performing appropriate image processing on an input image, the ideal image generating unit 104 generates an ideal image.

The degraded image generating unit 106 generates a degraded image from the ideal image generated by the ideal image generating unit 104. The degraded image generating unit 106 generates a degraded image on the basis of parameters relating to a camera, for example, parameters of a lens, parameters of a sensor, and the like.

The data generating device 1 outputs the ideal image generated by the ideal image generating unit 104 and the degraded image generated by the degraded image generating unit 106 through the input/output I/F 100 as training data. In addition, the data generating device 1 may store the training data in the storage unit 102. In this way, the data generating device 1 generates an ideal image of high image quality by performing an appropriate image recovery process on input data that has been acquired through actual image capturing and generates a degraded image by performing an arbitrary degradation process on this ideal image.

Figure 2:
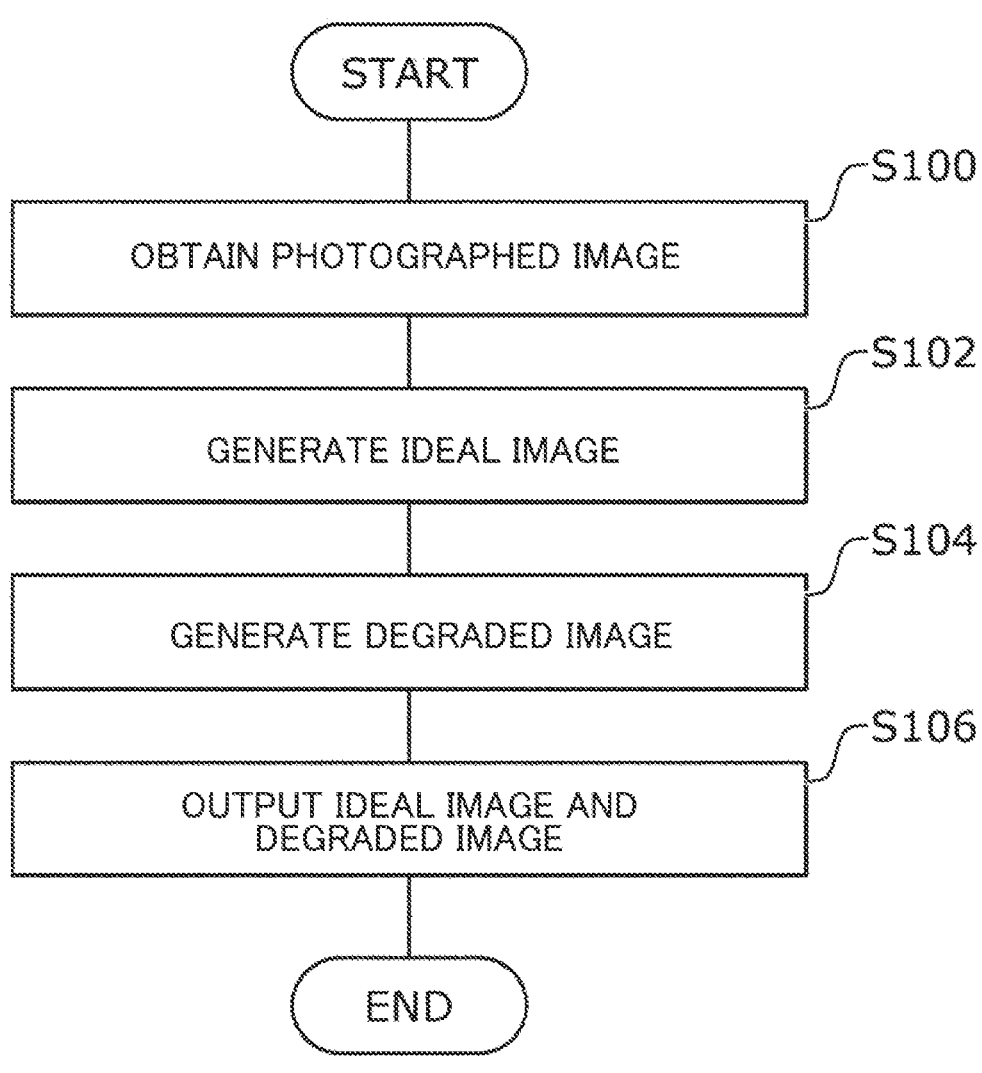
FIG. 2 is a flowchart showing a process of a data generating system according to an embodiment.

FIG. 2 is a flowchart showing a process according to this embodiment.

First, the data generating device 1 obtains images that have been actually shot (hereinafter referred to as captured images) through the input/output I/F 100 (S100). For example, each of the images may be an image for which specifications of a device are known or an image for which specifications of a device are unknown. An input image may be either a still image or a moving image. In the case of a moving image, an image may be obtained for each frame.

Next, the ideal image generating unit 104 generates an ideal image acquired by suppressing causes of degradation from a captured image (S102). In a case in which specifications of a device that has acquired a captured image are known, the ideal image generating unit 104 may correct degradations on the basis of the specifications, for example, specifications of a lens and a sensor. On the other hand, in a case in which specifications of a device that has captured a captured image are unknown, a general image correcting method such as inverse filter processing, calibration, or the like may be used.

Next, the degraded image generating unit 106 performs image processing on the ideal image, thereby generating a degraded image (S104). This image processing may be determined on the basis of a model that is a target for optimization of machine learning. For example, in a case in which a model is optimized such that an ideal image is output when a captured image obtained by a predetermined device is input, the degraded image generating unit 106 may degrade the image on the basis of parameters of a lens, a sensor, and the like of this predetermined device. In addition, the degraded image generating unit 106 may perform image processing for performing degradation based on not a device but a use on the ideal image.

Next, the data generating device 1 outputs a set of the ideal image and the degraded image as training data (S106). Here, for example, the outputting is a concept that also includes storing of data in the storage unit 102 of the data generating device 1 in accordance with outputting of the data from the data generating device 1 to an external file server and a machine learning device.

The machine learning device performs optimization of the model using training data generated in this way. In addition, an estimation device obtains an appropriate estimated image from an input image using the model optimized using training data generated in this way.

The process performed by the ideal image generating unit 104 will be described using a non-restricting specific example. The ideal image generating unit 104 generates an ideal image from an image captured by a camera of which specifications are known or unknown.

In a case in which the camera that has performed image capturing is known, several causes of degradation of a captured image according to the camera can be determined. For this reason, by performing image recovery based on causes of degradation of a lens system and a sensor system, an ideal image can be obtained. For example, in a case in which a point spread function (PSF) can be obtained from a lens system, an image acquired by eliminating blurring from a captured image may be obtained using a deconvolution filter based on the PSF. In this case, appropriate noise reduction and the like may be further performed on this image. In a case in which a cause of noise addition in a sensor system can be obtained, an image acquired by performing interpolation and the like based on the causes of noise addition may be acquired. Furthermore, in a case in which a parameter relating to a cause of degradation can be obtained, the ideal image generating unit 104 may generate an ideal image by performing appropriate image processing based on this parameter.

Also in a case in which a camera that has performed image capturing is unknown or the specification of a camera that has performed image-capturing is unknown, the ideal image generating unit 104 can generate an ideal image as in the following example.

For example, the ideal image generating unit 104 may suppress noise such as a shot noise, a pattern noise, and the like by reducing an image. A reduction algorithm may be an arbitrary algorithm. Before reduction, noise elimination may be performed in advance by performing a process such as an application of a Gaussian filter or the like.

For example, in a case in which random noise is generated and in a case in which imaging can be performed using an image-capturing device in which noise is generated, the ideal image generating unit 104 may consecutively obtain a plurality of images and perform a noise elimination process using the plurality of images. For example, by calculating an average of pixel values of a plurality of images in the same scene, the ideal image generating unit 104 can suppress random noise. In addition, not only an average value but a statistic other than an average value such as a mode, a median, or a variance value of pixels may be used in an ideal image generating process.

For example, the ideal image generating unit 104 may suppress degradation by using a global offset. Generally, there are cases in which a captured image has an offset in which an actually-black pixel value is not present. There may be various reasons for this such as a lens system, a light receiving system, and the like, and degradation of an image may be suppressed by calculating an offset by capturing a black image using an image-capturing device and by subtracting this offset value from the acquired image.

The ideal image generating unit 104 may perform image correction for suppressing various aberrations. For example, a spherical aberration, a coma aberration, an astigmatism, and an aberration of field curvature among Seidel aberrations can be suppressed by reducing an image. In addition, a reverse filter process using a shift-variant PSF may be performed.

The ideal image generating unit 104 may perform calibration for a distortion aberration. As the calibration, for example, a checker board is imaged using an image-capturing device, and a matrix (a distortion correction coefficient) used for performing image correction from a distortion of this captured image is calculated. Then, the ideal image generating unit 104 may correct a distortion of the captured image using this matrix.

Although several examples of acquisition of an ideal image using the ideal image generating unit 104 has been described, as described above, these are non-restricting specific examples and are described as examples for acquisition of a recovered image. The ideal image generating unit 104 may generate an ideal image from a captured image using any other recovery technique, such as, for example, blind deconvolution. In addition, in a case in which there is a learned model that is able to obtain an ideal image by correcting this image, the ideal image generating unit 104 may obtain an ideal image by using this learned model. Furthermore, the ideal image generating unit 104 may generate an ideal image using a plurality of methods instead of applying only one of the specific examples described above.

Next, a process performed by the degraded image generating unit 106 will be described using a non-restricting specific example. For example, the degraded image generating unit 106 may generate a degraded image using parameters relating to a camera of a device that becomes a target using an estimation model.

For example, in a case in which an ideal image for a captured image is desired to be automatically obtained by mounting an estimation model in a digital camera, the degraded image generating unit 106 generates a degraded image adjusted to characteristics of the digital camera for the ideal image. For example, characteristics of the digital camera may be defined using parameters of a lens system and a sensor system. In addition, a cause of degradation thereof may be on the basis of a distance to an imaging surface from the lens system and the sensor system.

For example, the degraded image generating unit 106 obtains parameters relating to a lens system such as the number of lenses, a power, a numerical aperture, a focal distance, and the like in the lens system of a camera capturing an image that is a target for recovery using an estimation model. On the basis of these acquired parameters, a certain degradation occurring at the time of passage through the lens system is analyzed, and a degradation process may be performed using a result of this analysis. This similarly applies also to the sensor system, and characteristics of a sensor may be perceived, and a degradation process may be performed by assuming a degradation such as a noise occurring in accordance with these characteristics.

In addition, in a case in which certain signal processing (may include image processing) is performed on raw data before an image-capturing device, which is a target for estimation, outputs an image, the same signal processing may be performed on an image on which the degradation process has been performed, and a resultant image may be output as a degraded image.

The data generating device 1 outputs images of the ideal image generating unit 104 and the degraded image generating unit 106 described above in association with each other as training data. In addition, the ideal image generated by the ideal image generating unit 104 may be separately stored. Then, generation of a degraded image for another target device may be performed using this ideal image.

As above, according to the data generating device 1 of this embodiment, an image captured by a certain device is not used as an ideal image, this captured image is converted into an ideal image, and a degraded image in a device that is a target is obtained therefrom, whereby training data for optimizing a model capable of performing estimation with high accuracy can be obtained. The reason for this is that, a captured image is an image that has already been degraded, and, even when this image is trained as an ideal image, a desirable result cannot be estimated. In addition, an ideal image can be appropriately changed to a certain image, and thus it can be arbitrarily determined which image a result estimated by the estimation model will become.

In addition, in accordance with the ideal image generating unit 104 generating an ideal image, the degraded image generating unit 106 can generate various degraded images. The reason for this is that a degradation process can be performed on an ideal image having no problems of a lens parameter and the like in a captured image. For example, CG data can be used as an ideal image, and, according to the data generating device 1 of this embodiment, a cost for generating the CG data can be reduced.

Figure 3:
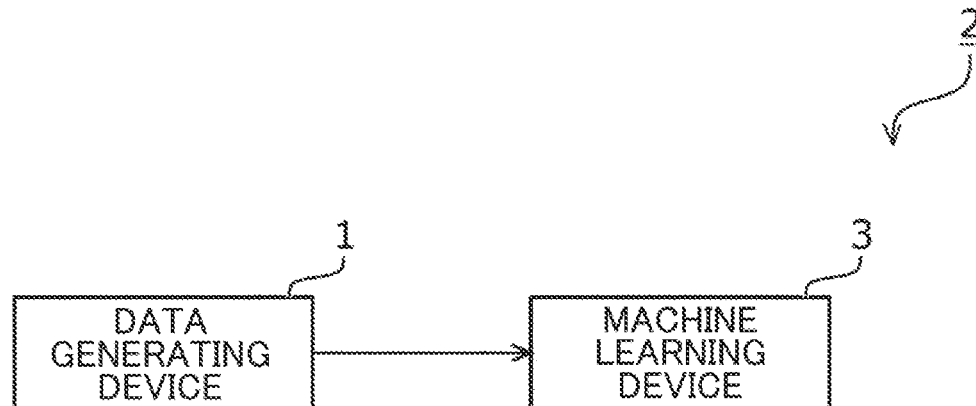
FIG. 3 is a diagram showing an example of a machine learning system according to an embodiment.

FIG. 3 shows a machine learning system 2 according to this embodiment. As illustrated in FIG. 3, the machine learning system 2 includes a data generating device 1 and a machine learning device 3. The machine learning device 3 optimizes a model using the ideal image and the degraded image generated by the data generating device 1 as training data. In addition, the data generating device 1 may be configured to be included in the machine learning device 3.

An estimation device including this model can estimate a desirable image from an image captured by a device that is a target.

According to all the embodiments described above, an actually-shot image is not used as an ideal image (teacher image) as it is, and an ideal image can be generated from this actually-shot image using a computer simulation. In addition, a degraded image for this ideal image can be also generated using a computer simulation. In this way, in a state in which there is neither an ideal image nor degraded image, training data can be generated from an actually-shot image. By changing parameters in a simulation, the generation of this degraded image can be also applied to various devices. For this reason, according to an aspect of the present disclosure, a degraded image in which parameters different in accordance with a product are appropriately set can be generated. In addition, although this degraded image is generated from an ideal image, an actually-shot image is not used as this ideal image, and an image of which degradation depending on a device, which has performed image-capturing, is recovered through a simulation can be used, and thus data of which quality is better as teacher data in training of machine learning can be generated.

An aspect of the present disclosure may be implemented using a program. The program may be stored in a storage unit, and information processing using software may be specifically realized by hardware. Processing of software may be performed by a processor such as a Central Processing Unit (CPU), a Graphics Processing Unit (GPU), or the like or may be implemented using various analog circuits or various digital circuits, for example, a Field Programmable Gate Array (FPGA), an Application Specific Integrated Circuit (ASIC), and a Digital Signal Processor (DSP).

<Application example using AI>

Figure 4:
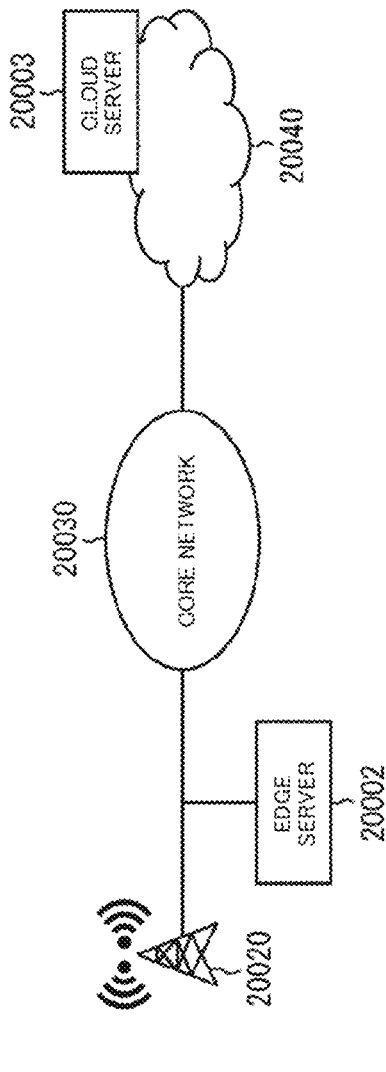
FIG. 4 is a diagram showing a configuration example of a system including a device performing an AI process.
Figure 4:
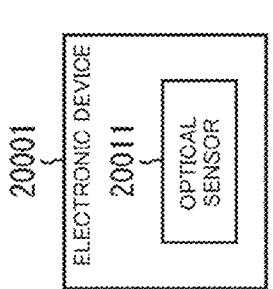

In a configuration to which the technology according to the present disclosure (the present technology) is applied, Artificial Intelligence (AI) such as machine learning can be used. FIG. 4 shows a configuration example of a system including a device performing an AI process.

An electronic device 20001 is a mobile terminal such as a smartphone, a tablet-type terminal, a mobile phone, or the like. The electronic device 20001 includes an optical sensor 20011. The optical sensor is a sensor (an image sensor) that converts light into an electrical signal. By being connected to a base station 20020 installed at a predetermined place through wireless communication that is compliant with a predetermined communication scheme, the electronic device 20001 can be connected to a network 20040 such as the Internet via a core network 20030.

At a position closer to a mobile terminal between the base station 20020 and the core network 20030 and the like, an edge server 20002 used for realizing Mobile Edge Computing (MEC) is disposed. A cloud server 20003 is connected to the network 20040. The edge server 20002 and the cloud server 20003 can perform various processes corresponding to uses. The edge server 20002 may be disposed inside the core network 20030.

An AI process is performed by the electronic device 20001, the edge server 20002, the cloud server 20003, or the optical sensor 20011. In the AI process, the technology according to the present disclosure is processed using AI such as machine learning. The AI process includes a learning process and a reasoning process. The learning process is s process of generating a learning model. In addition, a relearning process to be described below is also included in the learning process. The reasoning process is a process of reasoning using a learning model. Hereinafter, a process relating to the technology according to the present disclosure being processed without using AI will be referred to as a normal process to be distinguished from the AI process.

In the electronic device 20001, the edge server 20002, the cloud server 20003, or the optical sensor 20011, the AI process is realized by a processor such as a Central Processing Unit (CPU) executing a program or by using dedicated hardware such as a processor specialized for a specific use. For example, as a processor specialized for a specific use, a Graphics Processing Unit (GPU) can be used.

Figure 5:
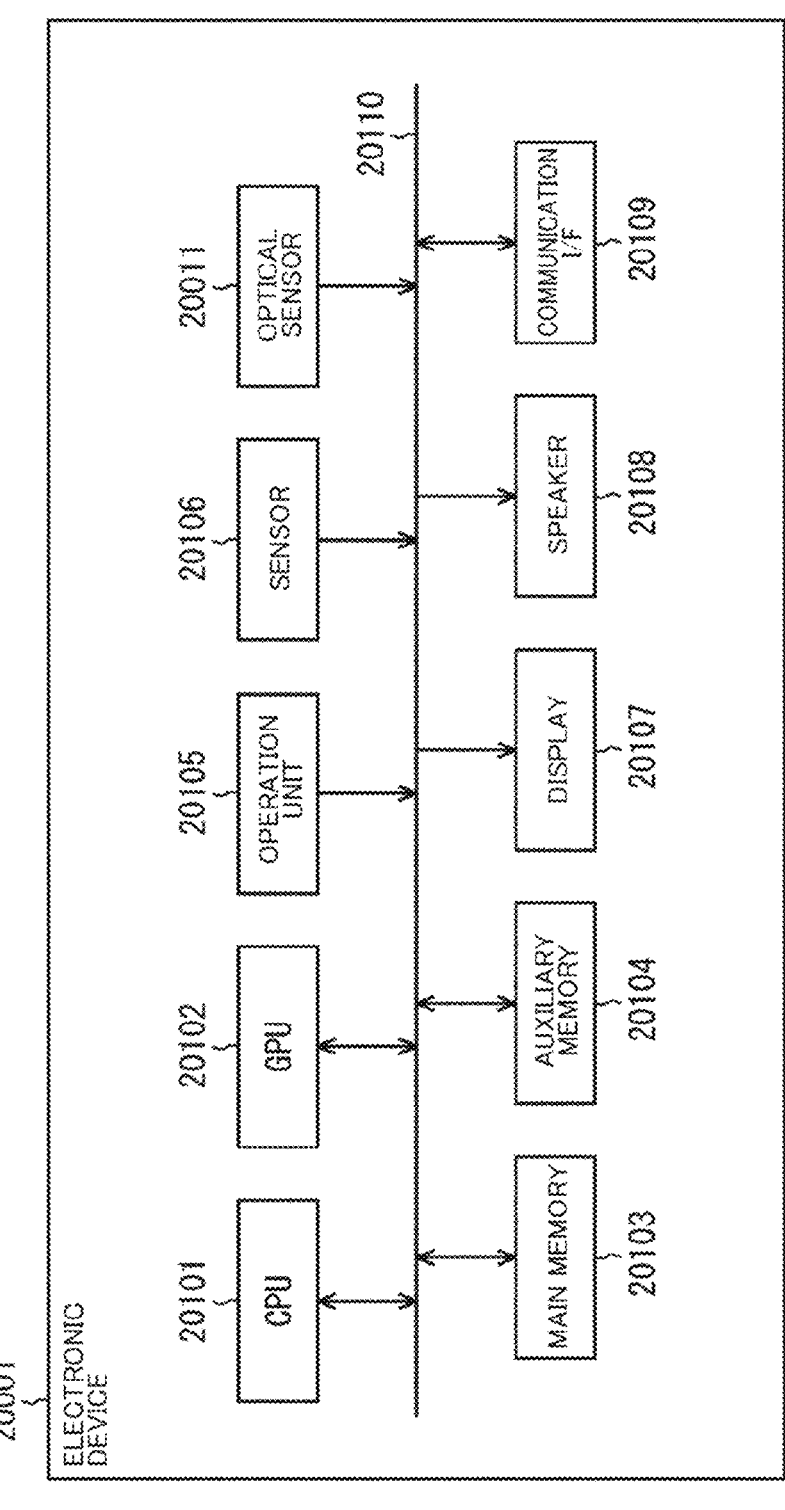
FIG. 5 is a block diagram showing a configuration example of an electronic device.

FIG. 5 shows a configuration example of the electronic device 20001. The electronic device 20001 includes a CPU 20101 that performs control of an operation of each unit and various processes, a GPU 20102 that is specialized in image processing and parallel processing, a main memory 20103 such as a Dynamic Random Access Memory (DRAM), and an auxiliary memory 20104 such as a flash memory.

The auxiliary memory 20104 records a program and data such as various parameters and the like for the AI process. The CPU 20101 expands the program and the parameters recorded in the auxiliary memory 20104 in the main memory 20103 and executes the program. Alternatively, the CPU 20101 and the GPU 20102 expands the program and the parameters recorded in the auxiliary memory 20104 into the main memory 20103 and executes the program. In accordance with this, the GPU 20102 can be used as a General-Purpose computing on Graphics Processing Units (GPGPU).

In addition, the CPU 20101 and the GPU 20102 may be configured as a System on a Chip (SoC). In a case in which the CPU 20101 executes a program for the AI process, the GPU 20102 may not be provided.

In addition, the electronic device 20001 includes an optical sensor 20011, an operation unit 20105 such as physical buttons, a touch panel, or the like, a sensor 20106 that includes at least one or more sensors, a display 20107 that displays information such as an image, texts, and the like, a speaker 20108 that outputs sounds, a communication I/F 20109 such as a communication module that is compliant with a predetermined communication scheme or the like, and a bus 20110 connecting these.

The sensor 20106 has at least one of various sensors such as an optical sensor (an image sensor), a sound sensor (a microphone), a vibration sensor, an acceleration sensor, an angular velocity sensor, a pressure sensor, an odor sensor, and a biosensor. In the AI process, data obtained from at least one or more sensors of the sensor 20106 can be used together with image data obtained from the optical sensor 20011. In this way, by using data acquired from sensors of various kinds together with image data, an AI process that is appropriate for various situations can be realized using multimodal AI technologies.

In addition, data acquired by integrally processing image data obtained from two or more optical sensors using sensor fusion technologies may be used in the AI process. The two or more optical sensors may be a combination of the optical sensor 20011 and an optical sensor disposed inside the sensor 20106, or a plurality of sensors may be included inside the optical sensor 20011. For example, in the optical sensors, a visible-light sensor of RGB, a distance measuring sensor of Time of Flight (ToF) or the like, a polarization sensor, an event-based sensor, a sensor obtaining an IR image, a sensor that is able to obtain multiple wave lengths, and the like are included.

The electronic device 20001 can perform an AI process using processors such as the CPU 20101, the GPU 20102, and the like. In a case in which the processor of the electronic device 20001 performs a reasoning process, after image data is obtained by the optical sensor 20011, a process can be started without requiring a time, and thus the process can be performed at a high speed. For this reason, in the electronic device 20001, when a reasoning process is used for uses of an application required to deliver information in a short delay time and the like, a user can perform an operation without discomfort due to a delay. In addition, in a case in which the processor of the electronic device 20001 performs an AI process, when compared to a case in which a server such as the cloud server 20003 is used, a communication line, a computer device for a server, and the like do not need to be used, and the process can be realized with a low cost.

Figure 6:
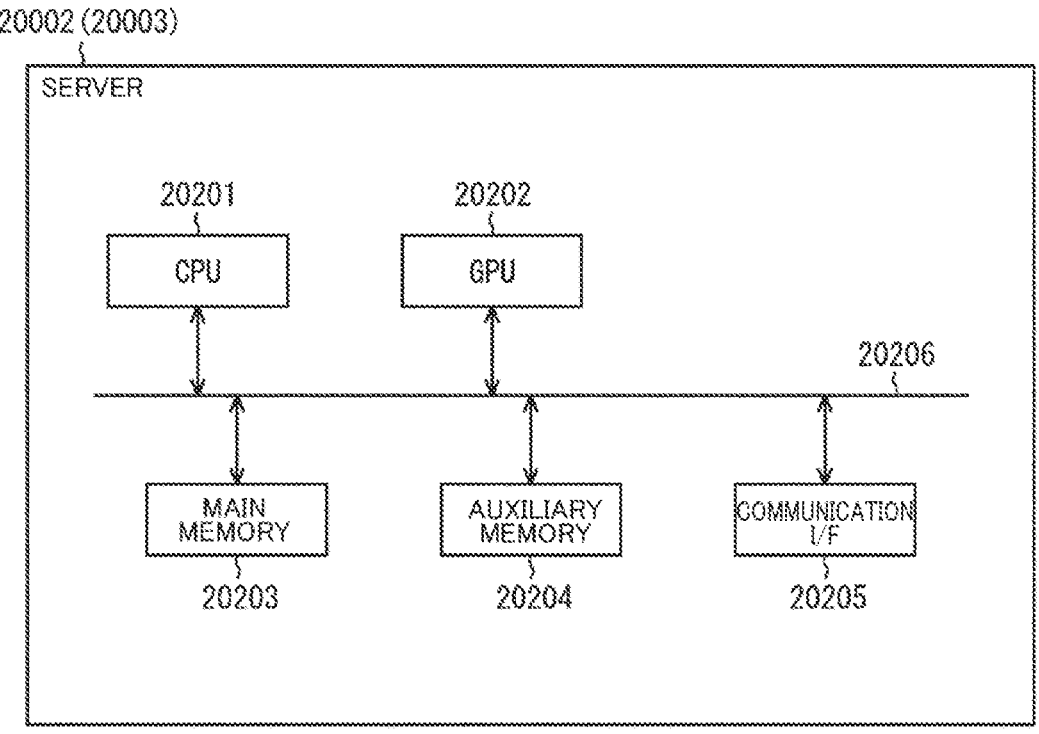
FIG. 6 is a block diagram showing a configuration example of an edge server or a cloud server.

FIG. 6 shows a configuration example of the edge server 20002. The edge server 20002 includes a CPU 20201 that performs control of an operation of each unit and various processes and a GPU 20202 that is specialized in image processing and parallel processing. The edge server 20002 further includes a main memory 20203 such as a DRAM, an auxiliary memory 20204 such as a hard disk drive (HDD), a solid state drive (SSD), or the like, and a communication I/F 20205 such as a network interface card (NIC), and these are connected to a bus 20206.

The auxiliary memory 20204 records a program and data such as various parameters and the like for an AI process. The CPU 20201 expands the program and the parameters recorded in the auxiliary memory 20204 in the main memory 20203 and executes the program. Alternatively, the CPU 20201 and the GPU 20202 expands the program and the parameters recorded in the auxiliary memory 20204 into the main memory 20203 and executes the program, whereby the GPU 20202 can be used as a GPGPU. In a case in which the CPU 20201 executes a program for the AI process, the GPU 20202 may not be provided.

The edge server 20002 can perform an AI process using the processors of the CPU 20201, the GPU 20202, and the like. In a case in which the processor of the edge server 20002 performs an AI process, when compared to the cloud server 20003, the edge server 20002 is disposed at a position relatively close to the electronic device 20001, and thus implementation of a low delay in the process can be realized. In addition, the processing capability of the edge server 20002 such as a calculation speed is higher than those of the electronic device 20001 and the optical sensor 20011 and thus can be configured for a general purpose. For this reason, in a case in which the processor of the edge server 20002 performs an AI process, when data can be received without depending on differences in the specifications and the performance between the electronic device 20001 and the optical sensor 20011, the AI process can be performed. In a case in which the AI process is performed by the edge server 20002, a processing load of the electronic device 20001 and the optical sensor 20011 can be reduced.

A configuration of the cloud server 20003 is similar to the configuration of the edge server 20002, and thus description thereof will be omitted.

The cloud server 20003 can perform an AI process using processors such as the CPU 20201, the GPU 20202, and the like. The cloud server 20003 has processing capabilities such as a calculation speed and the like that are higher than those of the electronic device 20001 and the optical sensor 20011 and can be configured for a general purpose. For this reason, in a case in which the processor of the cloud server 20003 performs an AI process, the AI process can be performed without being dependent on differences in the specifications and the performances of the electronic device 20001 and the optical sensor 20011. In addition, in a case in which it is difficult to perform an AI process of a high load using the processor of the electronic device 20001 or the optical sensor 20011, the AI process of the high load is performed by the processor of the cloud server 20003, and a result of the process can be fed back to the processor of the electronic device 20001 or the optical sensor 20011.

Figure 7:
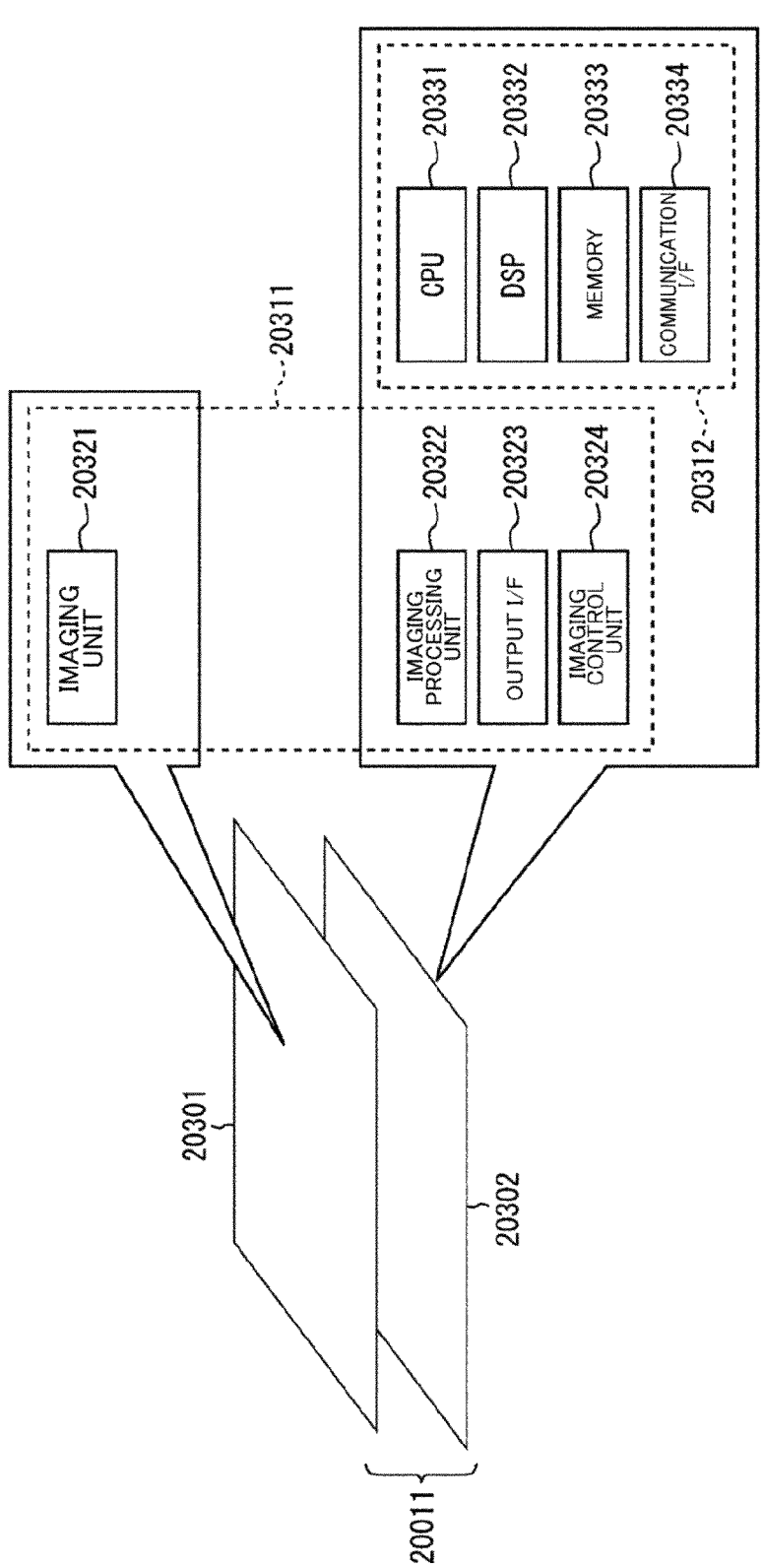
FIG. 7 is a block diagram showing a configuration example of an optical sensor.

FIG. 7 shows a configuration example of the optical sensor 20011. For example, the optical sensor 20011 can be configured as a semiconductor device of one chip having a stacked structure in which a plurality of substrates are stacked. The optical sensor 20011 is configured by stacking two substrates including a substrate 20301 and a substrate 20302. The configuration of the optical sensor 20011 is not limited to the stacked structure, and, for example, a substrate including an imaging unit may include a processor such as a CPU or a Digital Signal Processor (DSP) that performs an AI process.

In the substrate 20301 of the upper layer, an imaging unit 20321 configured by two-dimensionally aligning a plurality of pixels is mounted. In the substrate 20302 of the lower layer, an imaging processing unit 20322 that performs a process relating to capturing of an image in the imaging unit 20321, an output I/F 20323 that outputs a captured image and a result of signal processing to the outside, and an imaging control unit 20324 that controls capturing of an image in the imaging unit 20321 are mounted. An imaging block 20311 is configured using the imaging unit 20321, the imaging processing unit 20322, the output I/F 20323, and the imaging control unit 20324.

In addition, in the substrate 20302 of the lower layer, a CPU 20331 that performs control of each unit and various processes, a DSP 20332 that performs signal processing using a captured image, information supplied from the outside, and the like, a memory 20333 such as a Static Random Access Memory (SRAM), a Dynamic Random Access Memory (DRAM), or the like, and a communication I/F 20334 that exchanges necessary information with the outside are mounted. A signal processing block 20312 is configured using the CPU 20331, the DSP 20332, the memory 20333, and the communication I/F 20334. An AI process can be performed using at least one processor of the CPU 20331 and the DSP 20332.

In this way, the signal processing block 20312 for an AI process can be mounted in the substrate 20302 of the lower layer in the stacked structure in which a plurality of substrates are stacked. In accordance with this, image data obtained by the imaging block 20311 for imaging that is mounted in the substrate 20301 of the upper layer is processed by the signal processing block 20312 for an AI process that is mounted in the substrate 20302 of the lower layer, and thus a series of processes can be performed inside a semiconductor device of one chip.

The optical sensor 20011 can perform an AI process using a processor such as a CPU 20331 or the like. In a case in which the processor of the optical sensor 20011 performs an AI process such as a reasoning process or the like, a series of processes is performed inside a semiconductor device of one chip, and thus information does not leak to the outside of the sensor, whereby the confidentiality of information can be improved. In addition, data such as image data does not need to be transmitted to another device, and thus the processor of the optical sensor 20011 can perform an AI process such as a reasoning process or the like using the image data at a high speed. For example, when a reasoning process is used for a use for an application or the like requiring real time processing, the real time processing can be sufficiently secured. Here, the securing of real time processing represents being able to deliver information with a short delay time. In addition, when the processor of the optical sensor 20011 performs an AI process, by transmitting various kinds of metadata using the processor of the electronic device 20001, the process is reduced, and low power consumption can be achieved.

Figure 8:
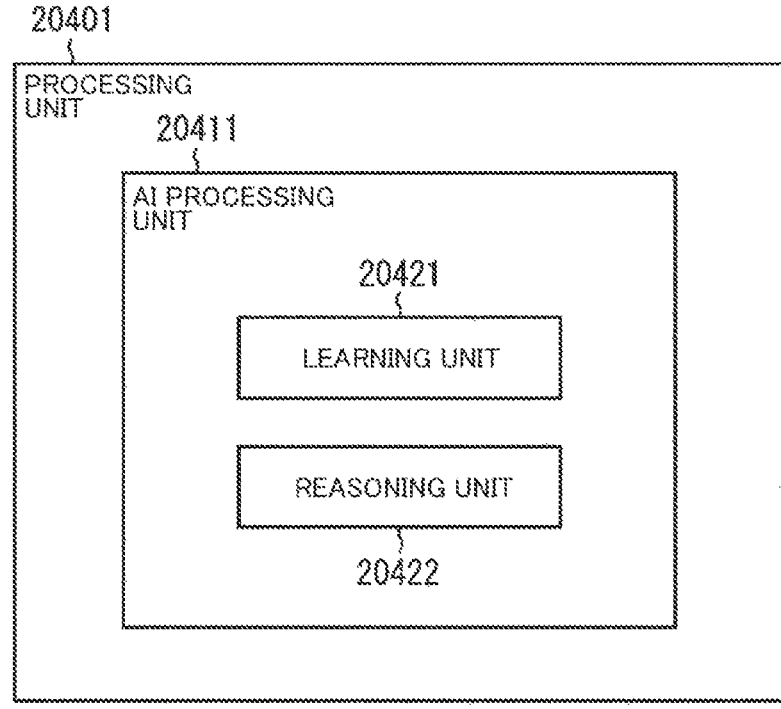
FIG. 8 is a block diagram showing a configuration example of a processing unit.

FIG. 8 shows a configuration example of the processing unit 20401. The processor of the electronic device 20001, the edge server 20002, the cloud server 20003, or the optical sensor 20011 performs various processes according to a program, thereby functioning as the processing unit 20401. In addition, a plurality of processors included in the same device or different devices may be caused to function as the processing unit 20401.

The processing unit 20401 includes an AI processing unit 20411. The AI processing unit 20411 performs an AI process. The AI processing unit 20411 includes a learning unit 20421 and a reasoning unit 20422.

The learning unit 20421 performs a learning process of generating a learning model. In the learning process, a machine learned-learning model for which machine learning for correcting correction target pixels included in image data has been performed is generated. In addition, the learning unit 20421 may perform a relearning process of updating a generated learning model. In the following description, although generation and update of a learning model will be separately described, updating of a learning model can be also regarded as generation of the learning model, and thus the meaning of update of a learning model is assumed to be included in generation of the learning model.

In addition, the generated learning model is recorded in a storage medium such as a main memory, an auxiliary memory, or the like included in the electronic device 20001, the edge server 20002, the cloud server 20003, the optical sensor 20011, or the like, thereby being able to be newly used in a reasoning process performed by the reasoning unit 20422. In accordance with this, the electronic device 20001, the edge server 20002, the cloud server 20003, the optical sensor 20011, or the like that performs a reasoning process based on this learning model can be generated. In addition, the generated learning model may be recorded in a storage medium or an electronic device that is independent from the electronic device 20001, the edge server 20002, the cloud server 20003, the optical sensor 20011, or the like and provided for being used by another device. The generation of the electronic device 20001, the edge server 20002, the cloud server 20003, the optical sensor 20011, or the like is assumed to include not only newly recording of a learning model in such a storage medium at the time of manufacturing but also updating of a generated learning model that has already been recorded.

The reasoning unit 20422 performs a reasoning process using a learning model. In the reasoning process, a process for correcting correction target pixels included in image data is performed using a learning model. The correction target pixels are pixels that are correction targets satisfying a predetermined condition among a plurality of pixels within an image corresponding to image data. As examples of the correction process, as described in the embodiment described above, there are correction of image degradation, noise correction, aberration correction, and the like, but the correction process is not limited thereto.

As a technique for machine learning, a neural network, deep learning, or the like can be used. The neural network is a model imitating a cranial nerve circuit of a human and is formed from layers of three types including an input layer, an intermediate layer (hidden layer), and an output layer. The deep learning is a model using a neural network having a multi-layer structure and enables a complex pattern present inside a large amount of data to be learned by repeating distinctive learning in each layer.

As problem settings in machine learning, supervised learning can be used. For example, in supervised learning, a characteristic amount is learned on the basis of teacher data to which a given label is attached. In accordance with this, a label of unknown data can be derived. As the teacher data, image data that has been actually obtained by an optical sensor, obtained image data that has been collected and managed, a data set generated by a simulator, or the like can be used. In addition, as a data set for learning in machine learning, as described in the embodiment described above, teacher image (an ideal image) corresponding to output data of the model described above may be generated from a captured image obtained by a predetermined device such as an optical sensor or the like, and a degraded image corresponding to input data of the model described above may be generated from the teacher data (the ideal image).

The learning is not limited to the supervised learning, and unsupervised learning, semi-supervised learning, reinforced learning, or the like may be used. In the unsupervised learning, characteristic amounts are extracted by analyzing a large amount of learning data to which no label has been attached, and clustering and the like are performed on the basis of the extracted characteristic amounts. In accordance with this, a trend can be analyzed and predicted on the basis of a large amount of unknown data. The semi-supervised learning is acquired by mixing supervised learning and unsupervised learning and is a method in which, after characteristic amounts are learned through supervised learning, while characteristic amounts are automatically calculated by giving a large amount of teacher data through unsupervised learning, repeated learning is performed. In the reinforced learning, a problem of determining an action to be taken is handled by an agent in a certain environment observing a current state.

In this way, the processor of the electronic device 20001, the edge server 20002, the cloud server 20003, or the optical sensor 20011 functions as the AI processing unit 20411, whereby an AI process is performed by one or a plurality of devices among such devices.

The AI processing unit 20411 may include at least one of the learning unit 20421 and the reasoning unit 20422. In other words, the processor of each device may be configured to perform both the learning process and the reasoning process or configured to perform one of the learning process and the reasoning process. For example, although the AI processing unit 20411 includes the learning unit 20421 and the reasoning unit 20422 in a case in which the processor of the electronic device 20001 performs both the reasoning process and the learning process, the AI processing unit 20411 may include only the reasoning unit 20422 in a case in which only the reasoning process is performed.

The processor of each device may perform all the processes relating to the learning process or the reasoning process, or, after some processes are performed by the processor of each device, the remaining processes may be performed by processors of the other devices. Each device may have a common processor used for performing each function of the AI process such as the learning process, the reasoning process, and the like or may have individual processors for respective functions.

In addition, the AI process may be performed by a device other than the devices described above. For example, the AI process may be performed by another electronic device to which the electronic device 20001 can be connected through wireless communication or the like. More specifically, in a case in which the electronic device 20001 is a smartphone, as another electronic device performing the AI process, a device such as another smartphone, a tablet-type terminal, a mobile phone, a Personal Computer (PC), a gaming machine, a TV receiver, a wearable terminal, a digital still camera, a digital video camera, or the like may be used.

In addition, also in a configuration using a sensor mounted in a mobile body of a vehicle or the like, a sensor used in a remote medical device, or the like, although an AI process such as the reasoning process or the like is applicable, a delay time is required to be short in such environments. In such environments, by performing the AI process using the processor of a device on a local side (for example, the electronic device 20001 as an in-vehicle device or a medical device) instead of performing the AI process using the processor of the cloud server 20003 via the network 20040, the delay time can be shortened. In addition, also in a case in which there is no environment for being connected to the network 20040 such as the Internet or in the case of a device used in an environment in which high-speed connection cannot be performed, for example, by performing the AI process using a processor of a local-side device such as the electronic device 20001, the optical sensor 20011, or the like, the AI process can be performed in a more appropriate environment.

The configuration described above is an example, and another configuration may be employed. For example, the electronic device 20001 is not limited to a mobile terminal such as a smartphone and may be an electronic device such as a PC, a gaming machine, a TV receiver, a wearable terminal, a digital still camera, or a digital video camera, an in-vehicle device, or a medical device. In addition, the electronic device 20001 may be connected to the network 20040 using wireless communication or wired communication that is compliant with a predetermined communication scheme such as a wireless local area network (LAN) or a wired LAN. The AI process is not limited to be performed by using a processor such as a CPU or a GPU of each device, and a quantum computer, a neuromorphic computer, or the like may be used.

(Flow of Process)

Figure 9:
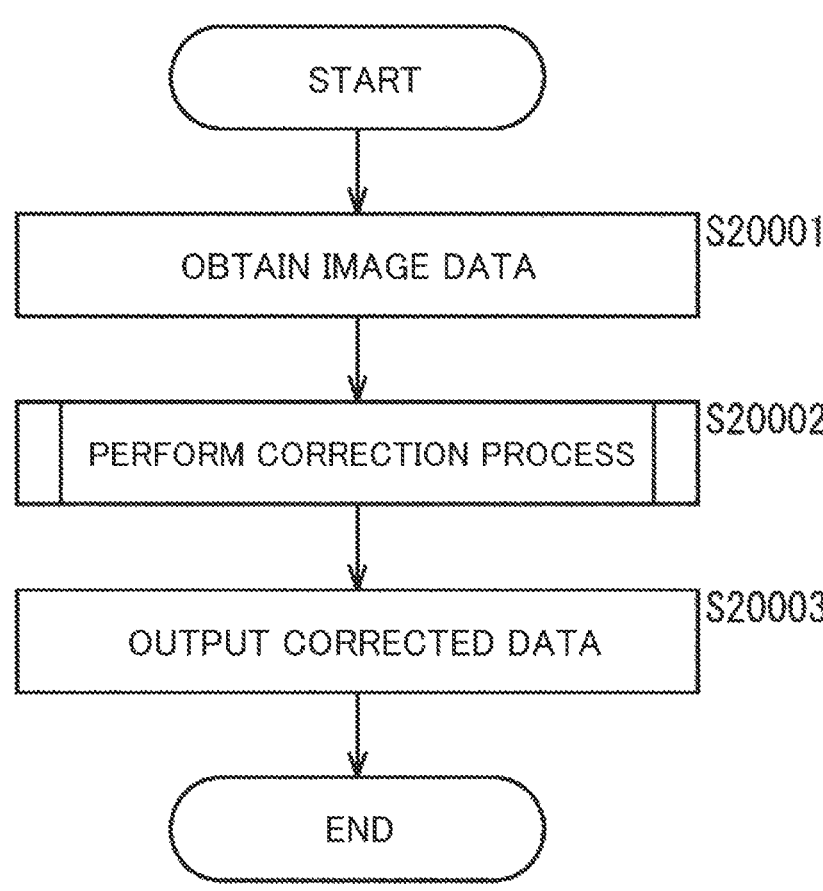
FIG. 9 is a flowchart illustrating a flow of a process using AI.

The flow of the process using AI will be described with reference to a flowchart shown in FIG. 9.

In Step S20001, the processing unit 20401 obtains image data from the optical sensor 20011. In Step S20002, for example, the processing unit 20401 performs a correction process for the obtained image data. In this correction process, by performing a reasoning process using a learning model on at least a part of the image data, corrected data that is data after correction of correction target pixels included in the image data is acquired. In Step S20003, the processing unit 20401 outputs the corrected data acquired in the correction process.

Figure 10:
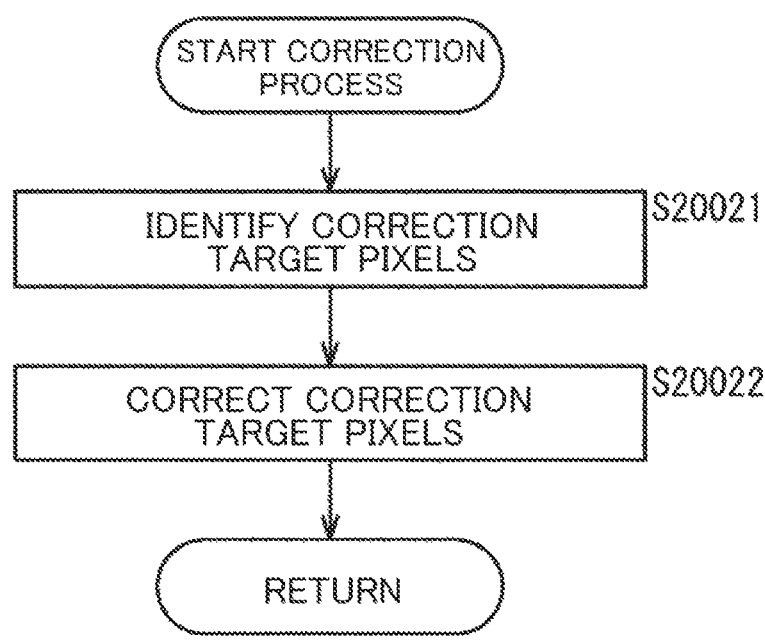
FIG. 10 is a flowchart illustrating a flow of a correction process.

Here, details of the correction process performed in Step S20002 described above will be described with reference to a flowchart shown in FIG. 10.

In Step S20021, the processing unit 20401 specifies correction target pixels included in the image data. In this step for identifying correction target pixels (hereinafter, referred to as an identifying step (Detection Step)), a reasoning process or a normal process is performed.

In a case in which the reasoning process is performed as the identifying step, in the reasoning unit 20422, by inputting image data to a learning model, information used for identifying correction target pixels included in input image data (hereinafter referred to as identifying information (Detection Information)) is output, and thus the correction target pixels can be identified. Here, a learning model having image data including correction target pixels as an input and having identifying information of correction target pixels included in the image data as an output is used. On the other hand, in a case in which a normal process is performed as the identifying step, a process of identifying correction target pixels included in the image data is performed without using AI using a processor or a signal processing circuit of the electronic device 20001 or the optical sensor 20011.

In Step S20021, when the correction target pixels included in the image data are identified, the process proceeds to Step S20022. In Step S20022, the processing unit 20401 corrects the identified correction target pixels. In this step of correcting correction target pixels (hereinafter referred to as a Correction step), a reasoning process or a normal process is performed.

In a case in which the reasoning process is performed as the correction step, in the reasoning unit 20422, by inputting image data and identifying information of correction target pixels to the learning model, corrected image data or identifying information of the corrected correction target pixels is output, and thus the correction target pixels can be corrected. Here, a learning model having image data including correction target pixels and identifying information of correction target pixels as inputs and having corrected image data or identifying information of corrected correction target pixels as an output is used. On the other hand, in a case in which the normal process is performed as the correction step, a process of correcting correction target pixels included in the image data is performed without using AI using a processor or a signal processing circuit of the electronic device 20001 or the optical sensor 20011.

In this way, in the correction process, a reasoning process or a normal process is performed in the identifying step of identifying correction target pixels, and a reasoning process or a normal process is performed in the correction step of correcting the identified correction target pixels, whereby the reasoning process is performed in at least one of the identifying step and the correction step. In other words, in the correction process, a reasoning process using a learning model is performed on at least a part of the image data supplied from the optical sensor 20011.

In addition, in the correction process, by using a reasoning process, the identifying step may be performed integrally with the correction step. In a case in which a reasoning process is performed as such a correction step, in the reasoning unit 20422, by inputting image data to a learning model, image data in which the correction target pixels are corrected is output, and thus the correction target pixels included in the input image data can be corrected. Here, a learning model having image data including correction target pixels as an input and having image data in which the correction target pixels are corrected as an output is used.

Figure 11:
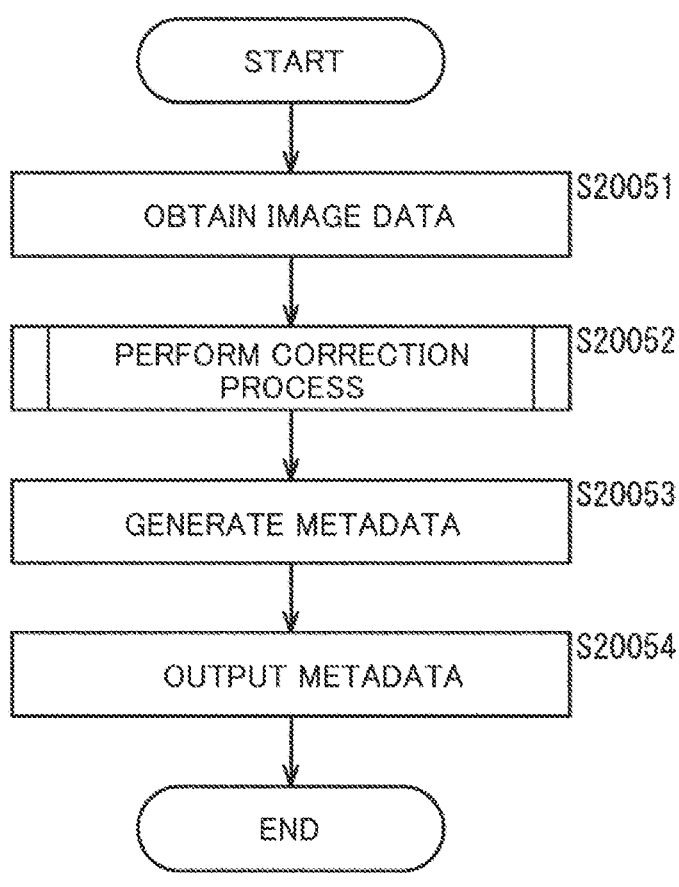
FIG. 11 is a flowchart illustrating a flow of a process using AI.

Meanwhile, in the processing unit 20401, meta data may be configured to be generated using corrected data. A flowchart of FIG. 11 shows the flow of a process performed in a case in which metadata is used.

In Steps S20051 and S20052, similar to Steps S20001 and S20002 described above, image data is obtained, and a correction process using the obtained image data is performed. In Step S20053, the processing unit 20401 generates metadata using corrected data acquired in the correction process. In this step of generating metadata (hereinafter referred to as a Generation step), a reasoning process or a normal process is performed.

In a case in which the reasoning process is performed as the generation step, in the reasoning unit 20422, by inputting corrected data to a learning model, metadata relating to the input corrected data is output, and thus the metadata can be generated. Here, a learning model having corrected data as an input and having metadata as an output is used. For example, three-dimensional data of a point cloud, a data structure, or the like is included in the metadata. In addition, the processes of Steps S20051 to S20054 may be performed through end-to-end machine learning. On the other hand, in a case in which the normal process is performed as the generation step, a process of generating metadata from corrected data is performed without using AI using a processor or a signal processing circuit of the electronic device 20001 or the optical sensor 20011.

As above, the electronic device 20001, the edge server 20002, the cloud server 20003, or the optical sensor 20011 performs, as a correction process using image data supplied from the optical sensor 20011, an identifying step of identifying correction target pixels and a correction step of correcting the correction target pixels or a correction step of correcting correction target pixels included in the image data. In addition, the electronic device 20001, the edge server 20002, the cloud server 20003, or the optical sensor 20011 may perform a generation step of generating metadata using corrected data acquired in the correction process.

In addition, by recording data such as the corrected data, the metadata, and the like in a readable recording medium, the storage medium in which such data is recorded and a device such as an electronic device in which the storage medium is mounted can be also generated. The storage medium may be a storage medium such as a main memory, an auxiliary memory, or the like included in the electronic device 20001, the edge server 20002, the cloud server 20003, or the optical sensor 20011 or may be a storage medium or an electronic device independent from those.

In a case in which the identifying step and the correction step are performed in the correction process, a reasoning process using a learning model can be performed in at least one step among the identifying step, the correction step, and the generation step. More specifically, after a reasoning process or a normal process is performed in an identifying step, a reasoning process or a normal process is performed in the correction step, and a reasoning process or a normal process is further performed in the generation step, whereby a reasoning process is performed in at least one step.

In addition, in a case in which only the correction step is performed in the correction process, a reasoning process is performed in the correction step, and a reasoning process or a normal process can be performed in the generation step. More specifically, after a reasoning process is performed in the correction step, a reasoning process or a normal process is performed in the generation process, whereby the reasoning process is performed at least in one step.

In this way, in the identifying step, the correction step, and the generation step, a reasoning process may be performed in all the steps, or it may be configured such that a reasoning process is performed in some steps, and a normal process is performed in the remaining steps. Hereinafter, a process performed in a case in which a reasoning process is performed in each step will be described.

(A) Process in a Case in which a Reasoning Process is Performed in the Identifying Step In a case in which an identifying step and a correction step are performed in the correction process, when a reasoning process is performed in the identifying step, the reasoning unit 20422 uses a learning model having image data including correction target pixels as an input and having identifying information of the correction target pixels included in the image data as an output. This learning model is generated in a learning process performed by the learning unit 20421, is provided for the reasoning unit 20422, and is used when a reasoning process is performed.

Figure 12:
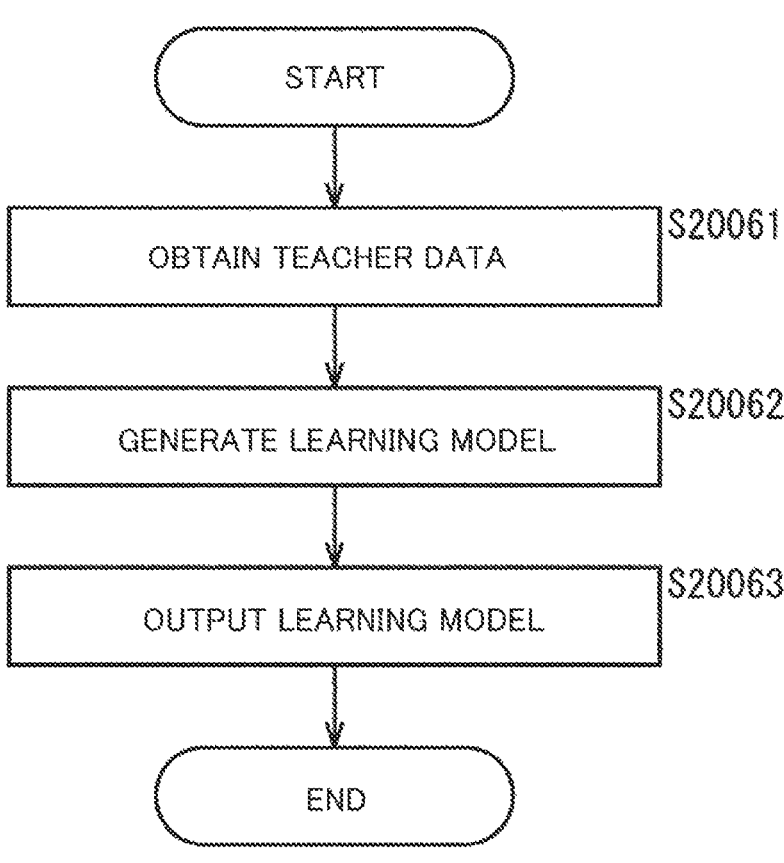
FIG. 12 is a flowchart illustrating a flow of a learning process.

The flow of a learning process performed in advance when a reasoning process is performed in an identifying step in a case in which the identifying step and a correction step are performed in the correction process will be described as below with reference to a flowchart of FIG. 12. In other words, the learning unit 20421 obtains image data actually obtained by an optical sensor, obtained image data that has been collected and managed, a data set generated by a simulator, and the like as teacher data (S20061) and generates a learning model using the obtained teacher data (S20062).

In addition, on the basis of the embodiment described above, after an ideal image is generated from a captured image obtained by a predetermined device such as an optical sensor or the like, a teacher image corresponding to output data of a learning model (identifying information of correction target pixels included in image data) may be generated, and a degraded image corresponding to input data of the learning model (the image data including the correction target pixels) may be further generated from the ideal image described above. In addition, each or one of the teacher image and the degraded image may be configured to be directly generated from the captured image.

As this learning model, a learning model having image data including correction target pixels as an input and having identifying information of the correction target pixels included in the image data as an output is generated and is output to the reasoning unit 20422 (S20063).

(B) Process in a Case in which a Reasoning Process is Performed in the Correction Step In a case in which an identifying step and a correction step are performed in the correction process, when a reasoning process is performed in the correction step, the reasoning unit 20422 uses a learning model having image data including correction target pixels and identifying information of the correction target pixels as inputs and having corrected image data or identifying information of corrected correction target pixels as an output. This learning model is generated in a learning process performed by the learning unit 20421.

The flow of a learning process performed in advance when a reasoning process is performed in a correction step in a case in which an identifying step and the correction step are performed in the correction process will be described as below with reference to the flowchart of FIG. 12. In other words, the learning unit 20421 obtains image data supplied from an optical sensor, a data set supplied from a simulator, and the like as teacher data (S20061) and generates a learning model using the obtained teacher data (S20062).

In addition, on the basis of the embodiment described above, after an ideal image is generated from a captured image obtained by a predetermined device such as an optical sensor or the like, a teacher image corresponding to output data of a learning model (corrected image data or identifying information of corrected correction target pixels) may be generated, and a degraded image corresponding to input data of the learning model (the image data including the correction target pixels and identifying information of the correction target pixels) may be further generated from the ideal image described above.

In addition, each or one of the teacher image and the degraded image may be configured to be directly generated from the captured image.

As this learning model, a learning model having image data including correction target pixels and identifying information of the correction target pixels as inputs and having corrected image data or identifying information of corrected correction target pixels as an output is generated and is output to the reasoning unit 20422 (S20063).

(C) Process in a Case in which a Reasoning Process is Performed in the Correction Step In a case in which only a correction step is performed in the correction process, when a reasoning process is performed in the correction step, the reasoning unit 20422 uses a learning model having image data including correction target pixels as an input and having image data in which the correction target pixels have been corrected as an output. This learning model is generated in a learning process performed by the learning unit 20421.

The flow of a learning process performed in advance when a reasoning process is performed in a correction step in a case in which only the correction step is performed in the correction process will be described as below with reference to the flowchart of FIG. 12. In other words, the learning unit 20421 obtains image data supplied from an optical sensor, a data set supplied from a simulator, and the like as teacher data (S20061) and generates a learning model using the obtained teacher data (S20062).

In addition, as described in the embodiment described above, a teacher (ideal) image corresponding to output data of a learning model (image data in which correction target pixels are corrected) may be generated from a captured image obtained by a predetermined device such as an optical sensor or the like, and a degraded image corresponding to input data of the learning model (image data including correction target pixels) may be further generated from the teacher (ideal) image.

In addition, each of the teacher image and the degraded image may be configured to be directly generated from the captured image.

As this learning model, a learning model having image data including correction target pixels as an input and having corrected image data in which the correction target pixels have been corrected as an output is generated and is output to the reasoning unit 20422 (S20063).

Figure 13:
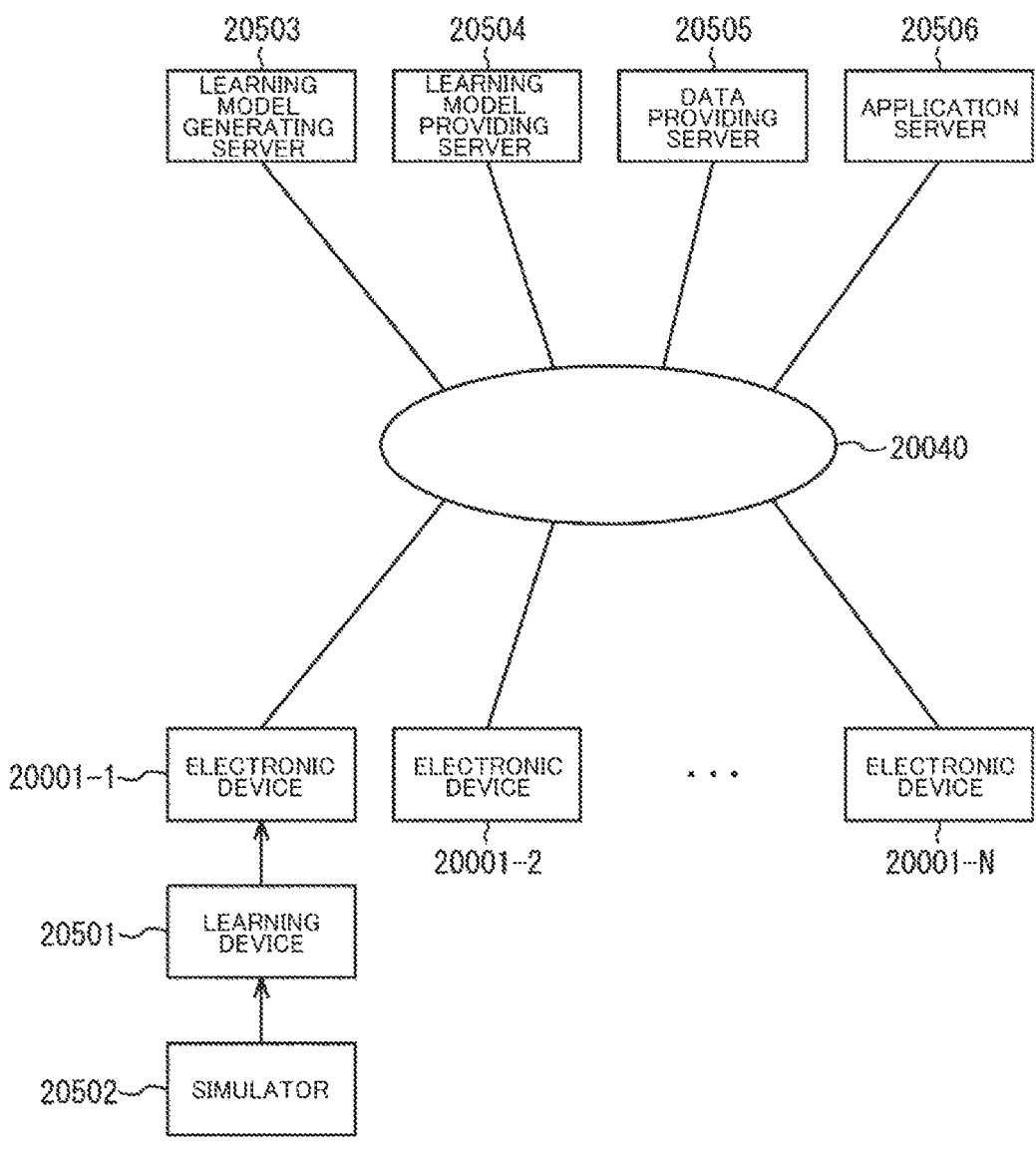
FIG. 13 is a diagram showing a flow of data between a plurality of devices.

Meanwhile, the learning model and data such as the image data, the corrected data, and the like are used inside a single device and may be exchanged among a plurality of devices and used inside such devices. FIG. 13 shows the flow of data among a plurality of devices.

Each of electronic devices 20001-1 to 20001-N (here N is an integer equal to or greater than 1) is held by each user and can be connected to the network 20040 such as the Internet through each base station (not shown) and the like. At the time of being manufactured, a learning device 20501 is connected to the electronic device 20001-1 and can record a learning model provided by the learning device 20501 in the auxiliary memory 20104. The learning device 20501 generates a learning model using a data set generated by a simulator 20502 as teacher data and supplies the generated learning model for the electronic device 20001-1. The teacher data is not limited to the data set supplied from the simulator 20502, and image data that has been actually obtained by an optical sensor, obtained image data that has been collected and managed, or the like may be used.

In addition, as a data set for learning in machine learning, as described above, after an ideal image is generated from a captured image obtained by a predetermined device such as an optical sensor or the like, teacher image corresponding to output data of the learning model may be generated, and a degraded image corresponding to input data of the learning model may be further generated from the ideal image.

In addition, each or one of the teacher image and the degraded image may be configured to be directly generated from the captured image.

In addition, as described in the embodiment described above, teacher image (an ideal image) corresponding to output data of the model described above may be generated from a captured image obtained by a predetermined device such as an optical sensor or the like, and a degraded image corresponding to input data of the model described above may be further generated from the teacher image (the ideal image) described above.

In addition, each of the teacher image and the degraded image may be directly generated from the captured image.

Although not shown, similar to the electronic device 20001-1, also the electronic devices 20001-2 to 20001-N can record a learning model in a stage at the time of being manufactured. Hereinafter, in a case in which the electronic devices 20001-1 to 20001-N do not need to be distinguished from each other, each thereof will be referred to as an electronic device 20001.

In addition to the electronic device 20001, a learning model generating server 20503, a learning model providing server 20504, a data providing server 20505, and an application server 20506 are connected to the network 20040, and data can be exchanged therebetween. Each server may be provided as a cloud server.

The learning model generating server 20503 has a configuration similar to the cloud server 20003 and can perform a learning process using a processor such as a CPU or the like. The learning model generating server 20503 generates a learning model using teacher data. In the illustrated configuration, although a case in which the electronic device 20001 records a learning model at the time of being manufactured has been shown, the learning model may be provided from the learning model generating server 20503. The learning model generating server 20503 transmits the generated learning model to the electronic device 20001 via the network 20040. The electronic device 20001 receives the learning model transmitted from the learning model generating server 20503 and records the learning model in the auxiliary memory 20104. In accordance with this, the electronic device 20001 including the learning model is generated.

In other words, in a case in which a learning model is not recorded in a stage at the time of being manufactured, the electronic device 20001 newly records a learning model transmitted from the learning model generating server 20503, whereby the electronic device 20001 in which the new learning model is recorded is generated. In addition, in a case in which a learning model has already been recorded in a stage at the time of being manufactured, the electronic device 20001 updates the recorded learning model with a learning model transmitted from the learning model generating server 20503, whereby the electronic device 20001 in which the updated learning model is recorded is generated. The electronic device 20001 can perform a reasoning process using the learning model that is appropriately updated.

A learning model is not limited to being directly provided from the learning model generating server 20503 to the electronic device 20001 and may be provided via the network 20040 by the learning model providing server 20504 that collects and manages various learning models. The learning model providing server 20504 is not limited to the electronic device 20001, and, by providing the learning model for another device, the device including the learning model may be generated. In addition, the learning model may be provided with being recorded in a memory card such as a flash memory or the like that can be attached and detached. The electronic device 20001 can read a learning model from a memory card mounted in a slot and record the learning model. In accordance with this, even in a case of being used under a severe environment, a case in which no communication function is provided, a case in which a communication function is provided and the amount of transmittable information is small, or the like, the electronic device 20001 can obtain a learning model.

The electronic device 20001 can provide data such as image data, corrected data, metadata, and the like to other devices via the network 20040. For example, the electronic device 20001 transmits data such as image data, corrected data, and the like to the learning model generating server 20503 via the network 20040. In accordance with this, the learning model generating server 20503 can generate a learning model using data such as image data, corrected data, and the like collected from one or a plurality of electronic devices 20001 as teacher data. By using more pieces of teacher data, the accuracy of the learning process can be improved.

Data such as image data, corrected data, or the like is not limited to being directly provided from the electronic device 20001 to the learning model generating server 20503, and a data providing server 20505 that collects and manages various kinds of data may provide the data. The data providing server 20505 may collect data not only from the electronic device 20001 but also from another device and may provide data not only for the learning model generating server 20503 but also for another device.

The learning model generating server 20503 may perform relearning process in which data such as image data, corrected data, and the like provided from the electronic device 20001 or the data providing server 20505 is added to the teacher data for the learning model that has already been generated and updates the learning model. The updated learning model can be provided for the electronic device 20001. In a case in which the learning model generating server 20503 performs a learning process or a relearning process, the process can be performed without being dependent on differences in the specifications and the performance of the electronic device 20001.

In addition, in a case in which a user performs a correction operation on the corrected data or the metadata (for example, in a case in which the user inputs correct information) in the electronic device 20001, feedback data relating to the correction process may be used in the relearning process. For example, by transmitting feedback data transmitted from the electronic device 20001 to the learning model generating server 20503, the learning model generating server 20503 can perform a relearning process using the feedback data transmitted from the electronic device 20001 and update the learning model. In addition, when a correction operation is performed by a user, an application provided by the application server 20506 may be used by the electronic device 20001.

The relearning process may be performed by the electronic device 20001. In a case in which the electronic device 20001 updates the learning model by performing a relearning process using image data and feedback data, the learning model can be enhanced inside the device. In accordance with this, the electronic device 20001 including the updated learning model is generated. In addition, the electronic device 20001 may transmit the learning model after update acquired in the relearning process to the learning model providing server 20504 so that the learning model is provided for other electronic devices 20001. In accordance with this, the learning model after update can be shared among a plurality of electronic devices 20001.

Alternatively, the electronic device 20001 may transmit differential information of the relearned learning model (differential information relating to a learning model before update and a learning model after update) to the learning model generating server 20503 as update information. The learning model generating server 20503 can generate a learning model that is enhanced on the basis of the update information transmitted from the electronic device 20001 and provide the generated learning model for other electronic devices 20001. By exchanging such differential information, privacy can be protected more than in a case in which all the information is exchanged, and a communication cost can be reduced. In addition, similar to the electronic device 20001, the optical sensor 20011 mounted in the electronic device 20001 may perform a relearning process.

The application server 20506 is a server that can provide various applications via the network 20040. The application provides a predetermined function using the learning model and data such as the corrected data, metadata, and the like. By executing an application downloaded from the application server 20506 via the network 20040, the electronic device 20001 can realize the predetermined function. Alternatively, the application server 20506 may realize a predetermined function by obtaining data from the electronic device 20001, for example, through an Application Programming Interface (API) or the like and executing the application on the application server 20506.

In this way, in a system including devices to which the present technology is applied, a learning model and data such as image data, corrected data, and the like are exchanged and circulated among the devices, and various services using such data can be provided. For example, a service that provides a learning model through the learning model providing server 20504 and a service that provides data such as image data, corrected data, and the like through the data providing server 20505 can be provided. In addition, a service that provides an application through the application server 20506 can be provided.

Alternatively, by inputting the image data obtained from the optical sensor 20011 of the electronic device 20001 to a learning model provided by the learning model providing server 20504, corrected data acquired as an output thereof may be provided. In addition, a device such as an electronic device in which a learning model provided by the learning model providing server 20504 is embedded may be generated and provided. Furthermore, by recording a learning model and data such as the corrected data, the metadata, and the like in a readable storage medium, the storage medium in which such data is recorded, a device such as an electronic device in which the storage medium is mounted may be generated and provided. The storage medium may be a nonvolatile memory such as a magnetic disk, an optical disc, a magneto-optical disc, or a semiconductor memory or may be a volatile memory such as an SRAM or a DRAM.

The aforementioned embodiments may have the following forms.

(1)

A data generating method of generating training data used in learning a model using a processor, the data generating method including:

generating an ideal image corresponding to output data of the model from a captured image obtained by a predetermined device; and generating a degraded image corresponding to input data of the model from the ideal image.

(2)

The data generating method described in (1), in which the ideal image is generated on the basis of degradation relating to a lens of the predetermined device.

(3)

The data generating method described in (1) or (2), in which the ideal image is generated on the basis of degradation relating to a sensor of the predetermined device.

(4)

The data generating method described in any one of (1) to (3), in which the ideal image is generated by reducing the captured image.

(5)

The data generating method described in any one of (1) to (4), in which the ideal image is generated on the basis of a plurality of still images in the same scene obtained by the predetermined device.

(6)

The data generating method described in (5), in which the ideal image is generated on the basis of statistics in the plurality of still images.

(7)

The data generating method described in (6), in which statistics include at least one of a mean value, a mode, a median, or a variance value of each pixel.

(8) The data generating method described in any one of (1) to (7), in which the ideal image is generated using a global offset for the captured image.

(9) The data generating method described in any one of (1) to (8), in which the ideal image is generated by calibrating the captured image.

(10) The data generating method described in any one of (1) to (9), in which the degraded image is generated on the basis of information about a target device that captures an input image of the model.

(11)

The data generating method described in (10), in which the degraded image is generated on the basis of degradation relating to a lens of the target device.

(12)

The data generating method described in (10) or (11), in which the degraded image is generated on the basis of degradation relating to a sensor of the target device.

(13)

The data generating method described in any one of (10) to (12), in which the degraded image is generated on the basis of signal processing performed by the target device.

(14)

A learning method of optimizing a model using training data generated by the data generating method described in any one of (1) to (13).

(15)

An estimation method of performing estimation using a model optimized using training data generated by the data generating method described in any one of (1) to 13.

(16)

A data generating device that is a device generating training data used in learning a model, the data generating device including a processor that executes a method described in one of (1) to (15).

(17)

A program causing a computer to execute a method described in any one of (1) to (15)

The aspects of the present disclosure are not limited to the embodiments described above and include various modifications that are conceivable, and effects of the present disclosure are not limited to the above-described content. Constituent elements of the embodiments may be appropriately combined for an application. In other words, various additions, changes, and partial deletions can be performed in a range not departing from the conceptual idea and spirit of the present disclosure derived from content specified in the claims and equivalents thereof.

REFERENCE SIGNS LIST

1 Data generating device
100 Input/output I/F
102 Storage unit
104 Ideal image generating unit
106 Degraded image generating unit

The invention claimed is:

1. A data generating method of generating training data used in learning a model using a processor, the data generating method comprising:

generating an ideal image corresponding to output data of the model from a plurality of still images captured by a predetermined device; and generating a degraded image corresponding to input data of the model from the ideal image, wherein the ideal image is generated based upon the plurality of still images of a same scene respectively captured by the predetermined device at a same angle.

2. The data generating method according to claim 1, wherein the ideal image is generated based upon degradation relating to a lens of the predetermined device.

3. The data generating method according to claim 1, wherein the ideal image is generated based upon degradation relating to a sensor of the predetermined device.

4. The data generating method according to claim 1, wherein the ideal image is generated by reducing at least one of the plurality of still images.

5. The data generating method according to claim 1, wherein the ideal image is generated based upon statistics in the plurality of still images.

6. The data generating method according to claim 5, wherein the statistics include at least one of a mean value, a mode, a median, or a variance value of each pixel.

7. The data generating method according to claim 1, wherein the ideal image is generated using a global offset for at least one of the plurality of still images.

8. The data generating method according to claim 1, wherein the ideal image is generated by calibrating at least one of the plurality of still images.

9. The data generating method according to claim 1, wherein the degraded image is generated based upon information about a target device that captures an input image of the model.

10. The data generating method according to claim 9, wherein the degraded image is generated based upon degradation relating to a lens of the target device.

11. The data generating method according to claim 9, wherein the degraded image is generated based upon degradation relating to a sensor of the target device.

12. The data generating method according to claim 9, wherein the degraded image is generated based upon signal processing performed by the target device.

13. A learning method of optimizing a model using training data generated by the data generating method according to claim 1.

14. An estimation method of performing estimation using a model optimized using training data generated by the data generating method according to claim 1.

15. A data generating device that generates training data used in learning a model, the data generating device comprising:

a memory storing a program, and at least one processor configured to execute the program to perform operations comprising:

generating an ideal image corresponding to output data of the model from a plurality of still images captured by a predetermined device; and generating a degraded image corresponding to input data of the model from the ideal image, wherein the ideal image is generated based upon the plurality of still images of a same scene respectively captured by the predetermined device at a same angle.

16. A non-transitory computer readable medium storing a program for generating training data used in learning a model, the program being executable by a processor to perform operations comprising:

generating an ideal image corresponding to output data of the model from a plurality of still images captured by a predetermined device; and generating a degraded image corresponding to input data of the model from the ideal image, wherein the ideal image is generated based upon the plurality of still images of a same scene respectively captured by the predetermined device at a same angle.

17. The non-transitory computer readable medium according to claim 16, wherein the ideal image is generated based upon statistics in the plurality of still images.

18. The data generating device according to claim 15, wherein the ideal image is generated based upon statistics in the plurality of still images.

\* \* \* \* \*